United States Patent
Kurakami

(10) Patent No.: US 9,860,278 B2
(45) Date of Patent: Jan. 2, 2018

(54) LOG ANALYZING DEVICE, INFORMATION PROCESSING METHOD, AND PROGRAM

(71) Applicant: NIPPON TELEGRAPH AND TELEPHONE CORPORATION, Chiyoda-ku (JP)

(72) Inventor: Hiroshi Kurakami, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 156 days.

(21) Appl. No.: 14/758,627

(22) PCT Filed: Jan. 30, 2014

(86) PCT No.: PCT/JP2014/052134
§ 371 (c)(1),
(2) Date: Jun. 30, 2015

(87) PCT Pub. No.: WO2014/119669
PCT Pub. Date: Aug. 7, 2014

(65) Prior Publication Data
US 2015/0341389 A1 Nov. 26, 2015

(30) Foreign Application Priority Data
Jan. 30, 2013 (JP) .................................. 2013-015288

(51) Int. Cl.
*H04L 29/06* (2006.01)
*H04L 12/26* (2006.01)

(52) U.S. Cl.
CPC .............. *H04L 63/20* (2013.01); *H04L 43/04* (2013.01); *H04L 63/1425* (2013.01)

(58) Field of Classification Search
CPC ....... H04L 43/04; H04L 43/06; H04L 43/062; H04L 43/065; H04L 63/14;
(Continued)

(56) References Cited

U.S. PATENT DOCUMENTS 7,752,665 B1 * 7/2010 Robertson ........... H04L 63/1458
713/154
2008/0162202 A1 * 7/2008 Khanna .................. G06Q 20/10
705/14.47
(Continued)

FOREIGN PATENT DOCUMENTS

CN 102385549 A 3/2012
CN 102722553 A 10/2012
(Continued)

OTHER PUBLICATIONS

NIST, Guide to Computer Security Log Management, Sep. 2006, http://nvlpubs.nist.gov/nistpubs/Legacy/SP/nistspecialpublication800-92.pdf.*
(Continued)

*Primary Examiner* — Khang Do
(74) *Attorney, Agent, or Firm* — Oblon, McClelland, Maier & Neustadt, L.L.P.

(57) ABSTRACT

A log information collecting unit that collects log information and traffic information output from a plurality of communication devices included in a network; a normalization processing unit that normalizes the log information and traffic information collected by the log information collecting unit; a log information analysis processing unit that extracts, and analyzes according to a predetermined rule, relative log information and traffic information from the normalized log information and traffic information, and determines whether or not there is unauthorized access; and an event information notifying unit that outputs event information including information indicating importance based on a result of the determination by the log information analysis processing unit, are included.

8 Claims, 3 Drawing Sheets

(58) Field of Classification Search
CPC ............. H04L 63/1408; H04L 63/1416; H04L 63/1425; H04L 63/20
See application file for complete search history.

(56) References Cited

U.S. PATENT DOCUMENTS

| | | | | |
|---|---|---|---|---|
| 2009/0077663 | A1* | 3/2009 | Sun ..................... | H04L 63/1416 726/23 |
| 2011/0191394 | A1* | 8/2011 | Winteregg .............. | G06F 17/30 707/822 |
| 2012/0167210 | A1* | 6/2012 | Oro Garcia ......... | H04L 63/1425 726/22 |
| 2012/0246303 | A1* | 9/2012 | Petersen ........... | G06F 17/30185 709/224 |
| 2015/0213358 | A1* | 7/2015 | Shelton .............. | H04L 41/0604 706/47 |

FOREIGN PATENT DOCUMENTS

| | | |
|---|---|---|
| JP | 2002-318734 A | 10/2002 |
| JP | 2004-30286 A | 1/2004 |
| JP | 2005-38116 A | 2/2005 |
| JP | 2005-128609 A | 5/2005 |
| JP | 2006-246010 A | 9/2006 |

OTHER PUBLICATIONS

Office Action issued Aug. 30, 2016 in Japanese Patent Application No. 2014-559743 (with English translation).
Extended European Search Report issued Oct. 14, 2016 in Patent Application No. 14746780.7.
Karen Scarfone, et al., "Guide to Intrusion Detection and Prevention Systems (IDPS)", National Institute of Standards and Technology, XP002617883, 2007, 127 pages (with cover page).
Masaru Sekihara, "Kizon System no Sotenken to Ippo Susunda Tsukaikata Firewall Saiteki Katsuyo no Point, Chapter 3 One-step Advanced Usage of Firewall [Log management, redundant configuration, operation monitoring services]," N+1 Network, vol. 3, No. 8, Sep. 1, 2013, pp. 063-067 (with English translation).
International Search Report issued Apr. 28, 2014 in PCT/JP2014/052134 filed Jan. 30, 2014.
Combined Office Action and Search Report issued on Mar. 31, 2017 in Chinese Patent Application No. 201480005638.2 with unedited computer generated English translation.
Karen Kent, et al, Guide to Computer Security Log Management, National Institute of Standards and Technology U.S. Department of Commerce, Sep. 13, 2006, 6 pages.

* cited by examiner

| No. | ITEM |
|---|---|
| 1 | TIME STAMP |
| 2 | TRANSMISSION SOURCE IP ADDRESS |
| 3 | DESTINATION IP ADDRESS |
| 4 | TRANSMISSION SOURCE PORT NUMBER |
| 5 | DESTINATION PORT NUMBER |
| 6 | PROTOCOL |
| 7 | DESTINATION URL |
| 8 | HTTP METHOD NAME |
| 9 | USER-AGENT NAME |
| 10 | NUMBER OF TRANSMITTED BYTES |
| 11 | NUMBER OF RECEIVED BYTES |
| ⋮ | ⋮ |
| n-1 | DEVICE IDENTIFICATION INFORMATION |
| n | CONNECTION IDENTIFICATION INFORMATION |

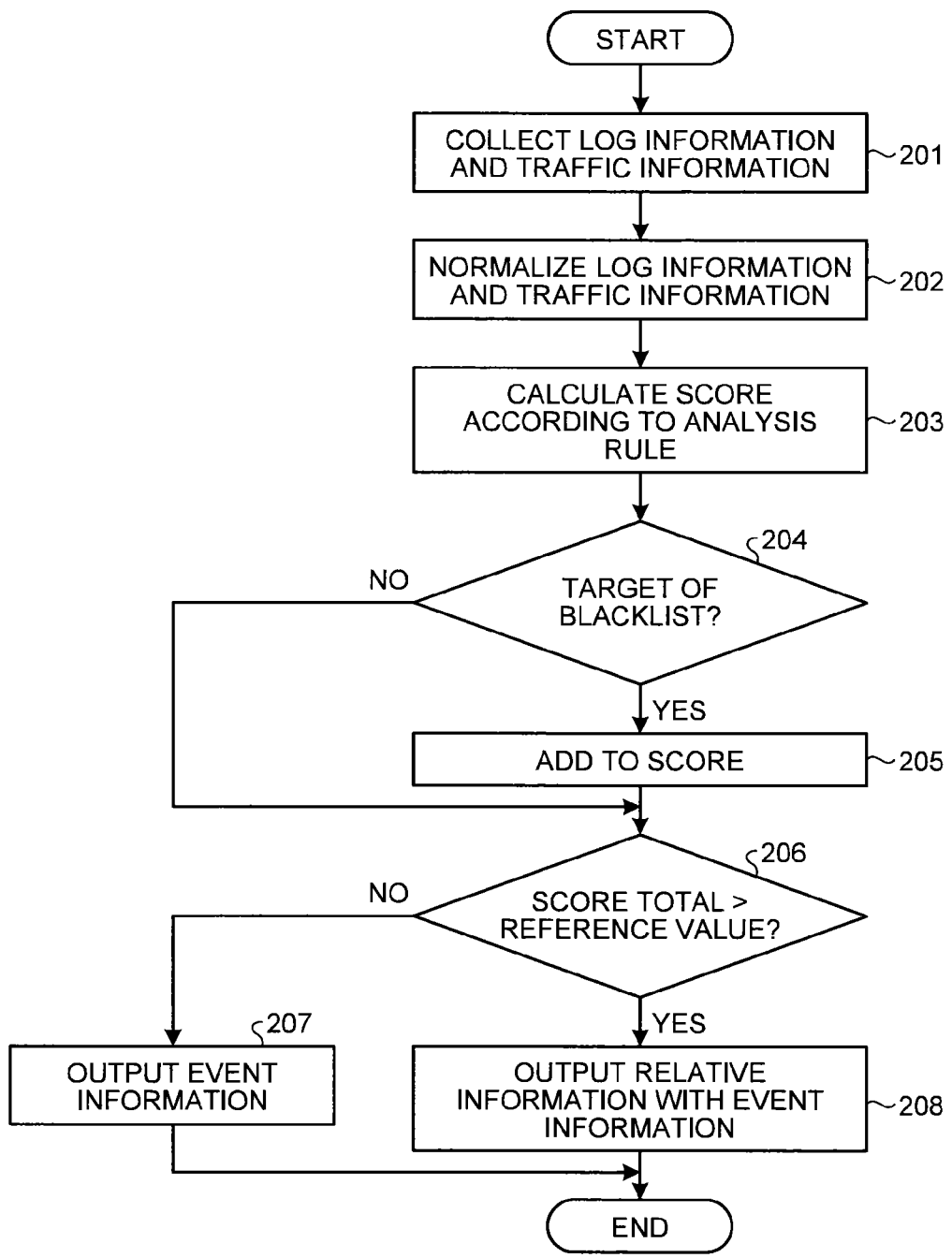

LOG ANALYZING DEVICE, INFORMATION PROCESSING METHOD, AND PROGRAM

FIELD

The present invention relates to a log analyzing device, an information processing method, and a program, and in particular, to a technique for detecting attacks related to network security.

BACKGROUND

In Internet Protocol (IP) networks, analysis using log information is conducted in order to detect unauthorized access. In Patent Literature 1, a method is disclosed, which facilitates monitoring and analysis, by grouping a plurality of events, based on synoptic correlations among events in consideration of differences among event types that are attributes of the events, addresses, and the like, for a large amount of logs output by an invasion detecting device that performs logging of abnormal access on a network.

CITATION LIST

Patent Literature

Patent Literature 1: Japanese Laid-open Patent Publication No. 2005-038116

SUMMARY

Technical Problem

However, without conducting association among and analysis of a plurality of pieces of log information based on hacking methods, detection of unauthorized access is considered to be difficult just by grouping a plurality of pieces of log information for packets.

An object of the present invention is to provide a log analyzing device, an information processing method, and a program for causing a computer to perform execution, which enable presence or absence of unauthorized access to be comprehensively determined based on log information and traffic information from a plurality of communication devices.

The above and other objects and novel features of the present invention will be disclosed by the description of this specification and drawings appended thereto.

Solution to Problem

To solve the problems described above and achieve the object, a log analyzing device that conducts security management of a network, the log analyzing device includes a log information collecting unit that collects log information and traffic information output from a plurality of communication devices included in the network; a normalization processing unit that normalizes the log information and traffic information collected by the log information collecting unit; a log information analysis processing unit that extracts, and analyzes according to a predetermined rule, relative log information and traffic information from the normalized log information and traffic information, and determines whether or not there is unauthorized access; and an event information notifying unit that outputs event information including information indicating importance based on a result of the determination by the log information analysis processing unit.

Further, an information processing method by a log analyzing device that conducts security management of a network, the information processing method includes collecting log information and traffic information output from a plurality of communication devices included in the network; normalizing the collected log information and traffic information; extracting, and analyzing according to a predetermined rule, relative log information and traffic information from the normalized log information and traffic information, and determining whether or not there is unauthorized access; and outputting event information including information indicating importance based on a result of the determination.

Further, a program for causing a computer that conducts security management of a network to execute collecting log information and traffic information output from a plurality of communication devices included in the network; normalizing the collected log information and traffic information; extracting, and analyzing according to a predetermined rule, relative log information and traffic information from the normalized log information and traffic information, and determining whether or not there is unauthorized access; and outputting event information including information indicating importance based on a result of the determination.

Advantageous Effects of Invention

By the present invention, based on log information and traffic information output from a plurality of communication devices in a network, importance of a problem caused by a communication connection due to an attack of unauthorized access is able to be determined comprehensively.

BRIEF DESCRIPTION OF DRAWINGS

FIG. 4 is a flow chart illustrating an operational sequence of the log analyzing device according to this embodiment.

DESCRIPTION OF EMBODIMENTS

An embodiment of the present invention will be described by using the drawings. The embodiment described below does not limit interpretation of scope of the claims of the present invention.

Figure 1:
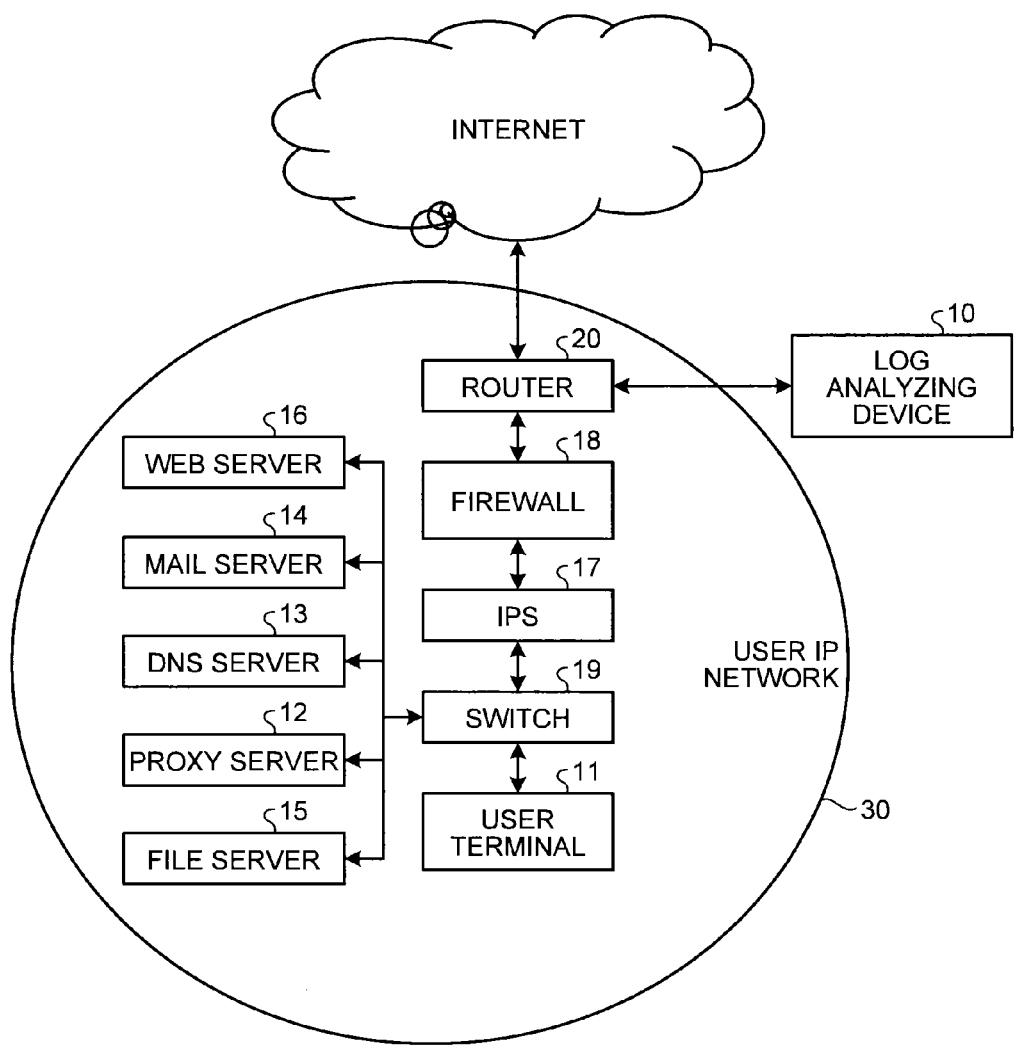
FIG. 1 is a block diagram illustrating an example of a configuration of a network, in which a log analyzing device according to this embodiment conducts security management.

FIG. 1 is a block diagram illustrating an example of a configuration of a network, in which a log analyzing device according to this embodiment conducts security management.

As illustrated in FIG. 1, a user IP network 30 has a user terminal 11, a Proxy server 12, a Domain Name System (DNS) server 13, a mail server 14, a file server 15, a Web server 16, an Intrusion Prevention System (IPS) 17, a firewall 18, a switch 19, and a router 20. In this embodiment, description will be made for a case where one user terminal 11 is provided for simplicity of explanation, but a plurality of user terminals may be provided in the user IP network 30.

The Proxy server 12, the Domain Name System (DNS) server 13, the mail server 14, the file server 15, the Web server 16, and the user terminal 11 are connected to the switch 19. The switch 19 is connected to the Internet via the IPS 17, the firewall 18, and the router 20. The IPS 17 and the firewall 18 prevent attack by unauthorized access and viruses from the Internet side. A log analyzing device 10, which conducts security management for the user IP network 30, is connected to the router 20.

As unauthorized access to the user terminal 11, for example, a case where a person with no use authority attacks security vulnerability of the user terminal 11 to use the user terminal 11 illegally, to falsify data in the user terminal 11, to make the user terminal 11 unusable, or the like, may be considered.

The Internet connected to the router 20 is an example of an external network, and the external network is not limited to the Internet. Further, the user IP network 30 is an example of a network to be subjected to security management, may be any network that is able to transmit data according to IP, and is a local area network (LAN), for example. Information communication devices included in the user IP network 30 are not limited to the configuration illustrated in FIG. 1.

Figures 2, 3:
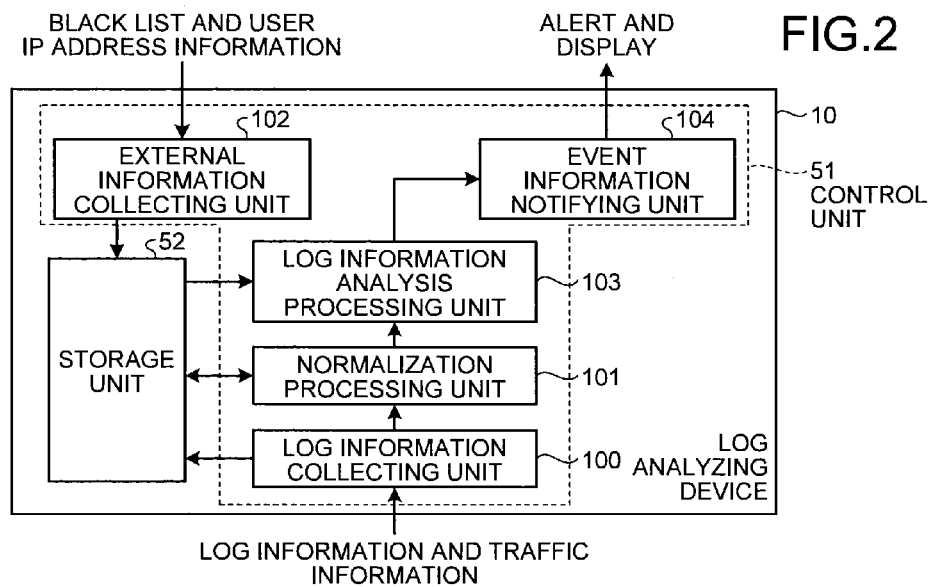
FIG. 2 is a block diagram illustrating an example of a configuration of the log analyzing device according to this embodiment.
FIG. 3 is a diagram illustrating an example of a log format.

Next, a configuration of the log analyzing device according to this embodiment will be described. FIG. 2 is a block diagram illustrating an example of a configuration of the log analyzing device according to this embodiment.

The log analyzing device 10 has a configuration with a control unit 51 and a storage unit 52. The control unit 51 has a log information collecting unit 100, a normalization processing unit 101, a log information analysis processing unit 103, an event information notifying unit 104, and an external information collecting unit 102.

In the control unit 51, a central processing unit (CPU) (not illustrated), which executes processing according to a program, and a memory (not illustrated), which stores therein the program, are provided. By the CPU executing processing according to the program, the log information collecting unit 100, the normalization processing unit 101, the log information analysis processing unit 103, the event information notifying unit 104, and the external information collecting unit 102, which are illustrated in FIG. 2, are virtually configured in the log analyzing device 10.

When the log information collecting unit 100 receives log information from the router 20, the switch 19, the firewall 18, the IPS 17, the Web server 16, the file server 15, the mail server 14, the DNS server 13, and the Proxy server 12, the log information collecting unit 100 stores the log information for each piece of device identification information obtained from the log information, into the storage unit 52. When the log information collecting unit 100 receives log information from the user terminal 11, the log information collecting unit 100 stores the log information correspondingly with a user ID (identifier) obtained from the log information and device identification information, into the storage unit 52. The user ID is an identifier different for each user of the user terminal.

Further, when the log information collecting unit 100 receives traffic information from the router 20, the switch 19, and the like, the log information collecting unit 100 stores the traffic information for each piece of device identification information obtained from the traffic information, into the storage unit 52. The pieces of device identification information are pieces of information for identifying communication devices, which are transmission sources of the log information or traffic information, and are pieces of information different among the communication devices.

The normalization processing unit 101 conducts normalization of uniformly organizing the log information and traffic information collected in the storage unit 52 into a data format that is easy to be searched and analyzed by the log information analysis processing unit 103. For example, a format of traffic information output by the router 20 may be different from a format of traffic information output by the switch 19.

Specifically, the normalization processing unit 101 updates, according to a predetermined common category rule, the log information and traffic information such that items included in the log information and traffic information (for example, a transmission source IP address, a destination IP address, transmission source port information, destination port information, protocol information, device identification information, a user ID, and the like) match a format common to all of the devices.

Further, the normalization processing unit 101 gives, to log information or traffic information of the same IP connection, a connection identifier, which is an identifier different for each connection, and store them into the storage unit 52. As a method of determining whether IP connections are the same, for example, if their pieces of log information or traffic information have the same user ID, transmission source IP address, destination IP address, transmission source port information, destination port information, and protocol information for time stamps within a fixed time period, even if their pieces of device identification information are different from each other, the IP connections are determined to be of the same connection. Hash values may be calculated for use, as an example of connection identification information. An example of a log format is illustrated in FIG. 3.

The external information collecting unit 102 obtains from outside and stores into the storage unit 52, a blacklist listing IP addresses and Uniform Resource Locators (URLs) as network addresses indicating malicious sites, and external information including a user IP address, for use by the log information analysis processing unit 103 in determination of a direction of communication (transmission direction of a packet) or analysis of attacks. The blacklist may be stored in a server (not illustrated) connected to the Internet, or may be stored in a server in the user IP network 30. The user IP address is able to be obtained from the user terminal 11.

The log information analysis processing unit 103 analyzes, based on a predetermined analysis rule, the normalized log information and traffic information, finds a plurality of scores, which become an index of importance related to whether or not a threat is posed to a user, compares a total of the plurality of scores with a predetermined reference value, and determines, based on a result of the comparison, whether or not there has been unauthorized access. If the total of the scores is larger than the reference value, the log information analysis processing unit 103 determines that there has been unauthorized access posing a threat. In this embodiment, methods of calculating the scores according to two types of analysis rules will be described.

According to a first one of the analysis rules, a score is given by making comprehensive determination from time series log information and traffic information of a fixed time period.

The log information analysis processing unit 103 extracts and refers to the time series log information and traffic information of the fixed time period from time stamp information, and determines a direction of communication according to, in which of items of the transmission source IP address and destination IP address the user IP address is described. Information on the direction of communication may be included in the log information and traffic information, and in that case, the log information analysis processing unit 103 may use that information.

Subsequently, the log information analysis processing unit 103 analyzes, based on the analysis rule, whether there is a specified event, which is an event having a specified characteristic, in the extracted log information and traffic information. If as a result of the analysis, the specified event is detected, the log information analysis processing unit 103 gives a score correspondingly with the number of times (occurrence frequency) the specified event has occurred in a specified time period, gives a score based on an occurrence interval of the specified event, gives a score based on the order in which a plurality of specified events have occurred and an occurrence interval of each of the specified events, gives a score based on a time period over which a specified event has not occurred in a specified time period, and gives a score based on a result of comparing, among a plurality of specified items, quantities summed up within a specified time period. The log information analysis processing unit 103 then finds a total of these scores.

The above described scoring is prescribed in order to thoroughly detect phenomena caused by various unauthorized accesses, but the scoring is not limited to the above mentioned five phenomena.

According to the above described scoring, the greater the occurrence frequency of a specified event is, the higher the score becomes, and the smaller the occurrence frequency of the specified event is, the higher the score becomes. Further, the closer the occurrence order of a plurality of specified events and the occurrence interval of each of the specified events are to predetermined occurrence order and occurrence interval, the higher the score becomes. The shorter the time period over which the specified event has not occurred within the specified time period is, the higher the score becomes.

An example of a score based on a result of comparing the quantities summed up within the specified time period among the plurality of specified items will be described with reference to FIG. 3. Herein, it is assumed that the log information illustrated in FIG. 3 has been output by the user terminal 11. If the plurality of specified items are assumed to be the number of transmitted bytes and the number of received bytes, an amount of transmitted bytes, which is a sum of transmitted bytes within a specified time period, is compared with an amount of received bytes, which is a sum of received bytes within the specified time period. If the amount of transmitted bytes is extremely larger than the amount of received bytes, a phenomenon of a lot of personal information being transmitted from the user terminal 11 is considered to be happening, and by making the score large, such unauthorized access becomes detectable.

According to a second one of the analysis rules, a plurality of communication processes of the same connection are identified, and a score is given by making comprehensive determination based on the identified plurality of communication processes.

The log information analysis processing unit 103 refers to the time stamp information to extract log information and traffic information of a fixed time period, and refers to connection identification information given to the extracted log information and traffic information. The log information analysis processing unit 103 recognizes log information and traffic information having the same the connection identification information that has been referred to, as those due to an event based on the same connection, and analyzes, based on the analysis rule, the recognized log information and traffic information, to thereby give a score according to presence or absence of detection of a specified event for each communication device and find a total of scores of the plurality of communication devices.

Specifically, the log information analysis processing unit 103 refers to the device identification information included in the log information and traffic information that have been recognized as those of the same connection, analyzes the log information or traffic information for each piece of device identification information, and if, as a result of the analysis, a specified event is detected, the log information analysis processing unit 103 gives a score to the communication device corresponding to that piece of device identification information, and if the specified event is not detected, the log information analysis processing unit 103 does not give a score thereto.

Association among the log information and traffic information to be analyzed is conducted based on a time series of a fixed time period according to the first analysis rule, and conducted based on the same connection identification information according to the second analysis rule.

Further, in addition to the scoring according to the above described two types of analysis rules, the log information analysis processing unit 103 determines whether or not any URL or IP address of the blacklist is included in the log information and traffic information, and if any URL or IP address of the blacklist is included in the log information or traffic information, the log information analysis processing unit 103 added a predetermined value to the score.

The event information notifying unit 104 outputs, based on a result of the determination by the log information analysis processing unit 103, event information including information on a total of the scores, as information indicating importance related to unauthorized access. Further, if the log information analysis processing unit 103 determines that unauthorized access has been detected, the event information notifying unit 104 outputs the log information and traffic information of the plurality of communication devices, which have been determined to be of an event based on the same connection, as relative information, in association with the event information, in order to notify a security administrator that there is a risk equal to or greater than a threat level that has been set beforehand with respect to unauthorized access.

If the security administrator is operating the log analyzing device 10, the event information notifying unit 104 causes a display device (not illustrated) connected to the log analyzing device 10 to display the event information, in order to alert the security administrator.

By referring to the event information output by the display device, the security administrator is able to determine, based on the total of the scores included in the event information, importance related to whether or not there is possibility of unauthorized access. Further, if the relative information is appended to the event information, the security administrator is able to recognize that unauthorized access posing a threat has been detected and to analyze the relative information in detail.

Even if the security administrator is not directly operating the log analyzing device 10, for example, an information terminal (not illustrated) that is operable by the security administrator may be connected to the Internet, and that information terminal may be made to be communicatable with the log analyzing device 10. In that case, the event information notifying unit 104 may transmit the event information to the information terminal via the router 20 and the Internet.

In this embodiment, a case where the log information collecting unit 100, the normalization processing unit 101, the log information analysis processing unit 103, the event information notifying unit 104, and the external information collecting unit 102 are virtually configured by the CPU executing the program has been described, but a part or all of this configuration may be configured of a dedicated circuit corresponding to each function thereof.

Next, operations of the log analyzing device according to this embodiment will be described with reference to FIG. 1, FIG. 2, and FIG. 4. FIG. 4 is a flow chart illustrating an operational sequence of the log analyzing device according to this embodiment.

Herein, it is assumed that a display device (not illustrated) is connected to the log analyzing device 10, and a security administrator is in a state of being able to operate the log analyzing device 10.

In the block diagram illustrated in FIG. 1, the firewall 18 and the IPS 17 monitor IP packets passing therethrough, and transmit log information obtained from the IP packets to the log analyzing device 10 via the router 20. The router 20 and the switch 19 transmit information on the transferred IP packets to the log analyzing device 10 as Netflow, sFlow (registered trademark), or IP packet traffic information. The Proxy server 12, the DNS server 13, the mail server 14, the file server 15, the Web server 16, and the user terminal 11 transmit log information related to access thereto to the log analyzing device 10. When the log information collecting unit 100 of the log analyzing device 10 collects the log information and traffic information from the communication devices in the user IP network 30, the log information collecting unit 100 stores these pieces of information into the storage unit 52 (Step 201).

It is assumed that the user terminal 11 is currently in a "Bot" state where the user terminal 11 has received, via the Internet, an attack from an information terminal of an attacker, has been infected with a virus, and has been manipulated by the attacker. An IP connection including an instruction from the attacker is assumed to be transferred in the order of, from the Internet side, via the router 20, the firewall 18, the IPS 17, the switch 19, and the Proxy server 12, to the user terminal 11. Upon this transfer, with respect to this IP connection, traffic information is transmitted from the router 20 and switch 19 to the log analyzing device 10, and log information is transmitted from the firewall 18, IPS 17, Proxy server 12, and user terminal 11 to the log analyzing device 10.

In this embodiment, to the traffic information and log information related to the IP connection including the instruction from the attacker, the user ID of the user terminal 11 and connection identification information of this IP connection are added by the normalization processing unit 101 (Step 202). Subsequently, the log information analysis processing unit 103 extracts log information of the firewall 18 and Proxy server 12 for the IP connection matching a characteristic having a possibility of a particular attack in the IPS 17, and analyzes, based on an analysis rule, whether or not it corresponds to an IP connection having a characteristic of a specified event. If it is determined to correspond to that IP connection, the log information analysis processing unit 103 gives a score thereto and if it is determined to not correspond to that IP connection, the log information analysis processing unit 103 does not give a score thereto.

Further, the log information analysis processing unit 103 analyzes abnormality in the HyperText Transfer Protocol (HTTP) header like the User-Agent with respect to the traffic information output from the router 20 and switch 19 for the IP connection matching the characteristic having the possibility of the particular attack, based on the analysis rule, and performs scoring if it is determined to be abnormal.

The log information analysis processing unit 103 finds a total of: the score based on the log information of the IPS 17; the score based on the log information of the firewall 18; the score based on the log information of the Proxy server 12; and the score for the traffic information output from the router 20 and switch 19. The greater the number of communication devices determined as having a high possibility of its IP connection being a particular attack is, the higher the total of these scores becomes.

As described above, with respect to a threat level related to a connection likely to be an attack, by combining scores determined from log information and traffic information output from a plurality of communication devices, possibility of unauthorized access is determined comprehensively.

A case for another analysis rule for Step 203 will be described.

By analyzing log information and traffic information of a time series in a fixed time period, such as in 24 hours or one week, the log information analysis processing unit 103 conducts scoring corresponding to the number of occurrences of a specified event in a specified time period, scoring based on an occurrence interval of the specified event, scoring based on the order of occurrence of a plurality of specified events and an occurrence interval of each of the specified events, scoring based on a time period over which a specified event has not occurred in a specified time period, and scoring based on a result of comparing quantities summed up for a specified time period among a plurality of specified items. Subsequently, the log information analysis processing unit 103 finds a total of these scores.

Although it is difficult to detect unauthorized access from log information alone, by extracting a plurality of pieces of information on attack connection from the log information and traffic information of the time series in the fixed time period as described above, unauthorized access is able to be detected.

Although the methods according to the two types of analysis rules have been described separately, the log information analysis processing unit 103 may find a score based on each of these two types of analysis rules, and use a larger one of the scores as a result of the processing of Step 203.

After the processing of Step 203, the log information analysis processing unit 103 determines whether or not any URL or IP address of the blacklist is included in the log information and traffic information (Step 204). If any URL or IP address of the blacklist is included in the log information or traffic information, the log information analysis processing unit 103 adds a predetermined value to the score (Step 205), and if the URLs and IP addresses of the blacklist are not included in the log information and traffic information, the log information analysis processing unit 103 proceeds to Step 206.

In order to determine importance based on the scores, the log information analysis processing unit 103 compares the total of the scores with a predetermined reference value and determines whether or not the total of the scores is greater than the reference value (Step 206). If the total of the scores is equal to or less than the reference value, the log information analysis processing unit 103 directly ends the processing. If, as a result of the determination of Step 206, a total value of the scores is found to be equal to or less than the reference value, the event information notifying unit 104 outputs the event information to the display device (not illustrated) (Step 207). If, as a result of the determination of Step 206, the total value of the scores is found to be greater than the reference value, the event information notifying unit 104 outputs the relative information, together with the event information, to the display device (not illustrated) (Step 208). The log analyzing device 10 repeats the sequence illustrated in FIG. 4.

For example, if log information and traffic information of a time series over a fixed time period are analyzed by the processing of Step S203, the log information analysis processing unit 103 conducts scoring corresponding to a difference between a transmitted amount and a received amount between the transmission source IP address and destination IP address included in the log information and traffic information of one week, and extracts an attack connection candidate of information leakage. This is because, if the transmitted amount is extremely larger than the received amount when the transmission source IP address is the user IP address, it is considered that information leakage from the user terminal 11 to the outside is happening. In this case, the value of the score becomes large. By similarly analyzing the log information and traffic information of the plurality of communication devices over the same fixed time period for the extracted attack connection candidate, a determination result indicating a threat level is able to be output.

According to this embodiment, by extracting relative log information and traffic information from log information and traffic information output from a plurality of communication devices in a network and analyzing a plurality of pieces of log information and traffic information according to a predetermined analysis rule, importance of a problem caused by communication connection due to attack of unauthorized access is able to be automatically and comprehensively determined without reliance on determination by a security administrator.

A program describing the sequence for executing the method of processing information according to the present invention may be installed in a computer, and the computer may be caused to execute the method of processing information according to the present invention.

REFERENCE SIGNS LIST

10 Log analyzing device
11 User terminal
12 Proxy server
13 DNS server
14 Mail server
15 File server
16 Web server
17 IPS
18 Firewall
19 Switch
20 Router
100 Log information collecting unit
101 Normalization processing unit
102 External information collecting unit
103 Log information analysis processing unit
104 Event information notifying unit

The invention claimed is:

1. A log analyzing device that conducts security management of a network, the log analyzing device comprising:
processing circuitry configured to
connect with a plurality of communication devices, which are included in the network and which each perform a different function in the network, from within the network;
collect log information and traffic information output from the plurality of communication devices included in the network, wherein the plurality of communication devices output the log information and traffic information in a different data format with respect to each other;
normalize the collected log information and traffic information into a common data format;
extract, and analyze according to a predetermined rule, relative log information and traffic information from the normalized log information and traffic information, and determine whether or not there is unauthorized access, wherein the processing circuitry extracts the relative log information and traffic information of a time series of a fixed time period from the normalized log information and traffic information, analyzes the extracted log information and traffic information based on the predetermined rule, and finds, if a specified event that is an event having a specified characteristic is detected, a total of at least: a score corresponding to the number of times the specified event has occurred in a specified time period; a score based on an occurrence interval of the specified event; a score based on the order of occurrence of a plurality of specified events and an occurrence interval of each of the specified events; a score based on a time period over which the specified event has not occurred in a specified time period; and a score based on a result of comparing quantities summed up for a specified time period among a plurality of specified items; and
output event information including information indicating importance based on a result of the determination of whether or not there is unauthorized access, wherein the processing circuitry compares the total of the scores with a predetermined reference value, and determines that there is unauthorized access if the total of the scores is greater than the reference value.

2. The log analyzing device according to claim 1, wherein the processing circuitry normalizes the collected log information and traffic information according to a predetermined common category rule, identifies log information and traffic information with predetermined items thereof being common thereto as those of the same connection, the predetermined items being from a plurality of items included in the normalized log information and traffic information, and gives connection identification information that is an identifier different for each connection to the log information and traffic information.

3. The log analyzing device according to claim 2, wherein the processing circuitry refers to the connection identification information given to the extracted log information and traffic information, recognizes log information and traffic information with the same connection identification information as those of an event based on the same connection, gives, to each of the communication devices, a score according to presence or absence of detection of the specified event that is an event having a specified characteristic by analyzing the recognized log information and traffic information based on the predetermined rule.

4. The log analyzing device according to claim 3, wherein the processing circuitry is further configured to obtain from outside a blacklist listing network addresses indicating malicious sites, wherein processing circuitry updates, if a network address included in the log information or traffic information of at least one of the plurality of communication devices is included in the blacklist, the total of the scores by adding a predetermined value to the total of the scores.

5. The log analyzing device according to claim 1, wherein the processing circuitry outputs the event information including information on the total of the scores, as the information indicating importance, and if the processing circuitry determines that there is unauthorized access, the processing circuitry outputs, together with the event information, log information and traffic information based on the same event as relative information.

6. The log analyzing device according to claim 1, wherein the processing circuitry obtains from outside a blacklist listing network addresses indicating malicious sites,
wherein processing circuitry updates, if a network address included in the log information or traffic information of at least one of the plurality of communication devices is included in the blacklist, the total of the scores by adding a predetermined value to the total of the scores.

7. An information processing method implemented by processing circuitry of a log analyzing device that conducts security management of a network, the information processing method including:
connecting with a plurality of communication devices, which are included in the network and which each perform a different function in the network, from within the network;
collecting log information and traffic information output from the plurality of communication devices included in the network, wherein the plurality of communication devices output the log information and traffic information in a different data format with respect to each other;
normalizing the collected log information and traffic information into a common data format;
extracting, and analyzing according to a predetermined rule, relative log information and traffic information from the normalized log information and traffic information, and determining whether or not there is unauthorized access, including extracting the relative log information and traffic information of a time series of a fixed time period from the normalized log information and traffic information, analyzing the extracted log information and traffic information based on the predetermined rule, and finding, if a specified event that is an event having a specified characteristic is detected, a total of at least: a score corresponding to the number of times the specified event has occurred in a specified time period; a score based on an occurrence interval of the specified event; a score based on the order of occurrence of a plurality of specified events and an occurrence interval of each of the specified events; a score based on a time period over which the specified event has not occurred in a specified time period; and a score based on a result of comparing quantities summed up for a specified time period among a plurality of specified items; and
outputting event information including information indicating importance based on a result of the determination of whether or not there is unauthorized access by comparing the total of the scores with a predetermined reference value, and determining that there is unauthorized access if the total of the scores is greater than the reference value.

8. A non-transitory computer readable storage medium having stored therein a program which causes a computer to execute a process comprising:
connecting with a plurality of communication devices, which are included in a network and which each perform a different function in the network, from within the network;
collecting log information and traffic information output from the plurality of communication devices included in the network, wherein the plurality of communication devices output the log information and traffic information in a different data format with respect to each other;
normalizing the collected log information and traffic information into a common data format;
extracting, and analyzing according to a predetermined rule, relative log information and traffic information from the normalized log information and traffic information, and determining whether or not there is unauthorized access, including extracting the relative log information and traffic information of a time series of a fixed time period from the normalized log information and traffic information, analyzing the extracted log information and traffic information based on the predetermined rule, and finding, if a specified event that is an event having a specified characteristic is detected, a total of at least: a score corresponding to the number of times the specified event has occurred in a specified time period; a score based on an occurrence interval of the specified event; a score based on the order of occurrence of a plurality of specified events and an occurrence interval of each of the specified events; a score based on a time period over which the specified event has not occurred in a specified time period; and a score based on a result of comparing quantities summed up for a specified time period among a plurality of specified items; and
outputting event information including information indicating importance based on a result of the determination of whether or not there is unauthorized access by comparing the total of the scores with a predetermined reference value, and determining that there is unauthorized access if the total of the scores is greater than the reference value.

* * * * *